US011875370B2

(12) United States Patent
Furphy et al.

(10) Patent No.: US 11,875,370 B2
(45) Date of Patent: Jan. 16, 2024

(54) AUTOMATED REPLENISHMENT SHOPPING HARMONIZATION

(71) Applicant: Replenium Inc., Seattle, WA (US)

(72) Inventors: Thomas W. Furphy, Sammamish, WA (US); William Justin Leigh, Seattle, WA (US); Umair Bashir, Issaquah, WA (US); Terrence Nightingale, Seattle, WA (US); Reda Ijaz, Seattle, WA (US)

(73) Assignee: Replenium Inc., Seattle, WA (US)

( * ) Notice: Subject to any disclaimer, the term of this patent is extended or adjusted under 35 U.S.C. 154(b) by 401 days.

(21) Appl. No.: 17/126,916

(22) Filed: Dec. 18, 2020

(65) Prior Publication Data
US 2022/0198495 A1 Jun. 23, 2022

(51) Int. Cl.
*G06Q 30/0204* (2023.01)
*G06Q 10/083* (2023.01)
(Continued)

(52) U.S. Cl.
CPC ......... *G06Q 30/0205* (2013.01); *G06F 16/26* (2019.01); *G06N 20/00* (2019.01);
(Continued)

(58) Field of Classification Search
CPC .. G06Q 30/02; G06Q 10/067; G06Q 10/0838; G06Q 10/0875; G06Q 30/0641;
(Continued)

(56) References Cited

U.S. PATENT DOCUMENTS 6,434,544 B1 8/2002 Bakalash et al.
6,609,101 B1 * 8/2003 Landvater .......... G06Q 30/0202
705/7.31

(Continued)

OTHER PUBLICATIONS

Replenium, the Intelligent Auto-Replenishment and Subscription Solution for Retailers, Announces $8 Million Series A Led by GLP: Team of Amazon veterans will use funding to accelerate deployment of services to retailers, e-commerce platforms and brands PR Newswire [New York] Nov. 7, 2019.*

(Continued)

*Primary Examiner* — Timothy Padot

(57) ABSTRACT

An auto-replenishment platform may receive retailer, manufacturer, and $3^{rd}$ party consumer data on a regular time interval, via their e-commerce platforms. The auto-replenishment platform, via a harmonization engine, may aggregate all data sets, mine the aggregated data, and then cluster the data. Subsequently, the auto-replenishment platform may generate a consumer model for predicting the consumer demand for a product, factors that influence a consumer's perception of convenience or ease in purchasing that product, and for aggregating a consumer's purchased products for shipment or pickup. The auto-replenishment platform may send the consumer model to the retailer, manufacturer, and $3^{rd}$ party e-commerce platforms to integrate the auto-replenishment platform into those platforms. Additionally, the auto-replenishment platform may group a consumer's products for shipment which provides additional efficiencies for the customer and retailer/manufacturer/$3^{rd}$ party in the form of time savings and/or reduced shipping and handling cost and related logistical advantages.

20 Claims, 4 Drawing Sheets

(51) Int. Cl.
*G06Q 30/0601* (2023.01)
*G06Q 10/067* (2023.01)
*G06N 20/00* (2019.01)
*G06F 16/26* (2019.01)
*G06Q 10/0875* (2023.01)
*G06Q 10/0631* (2023.01)

(52) U.S. Cl.
CPC ....... *G06Q 10/067* (2013.01); *G06Q 10/0838* (2013.01); *G06Q 10/0875* (2013.01); *G06Q 30/0641* (2013.01); *G06Q 10/06315* (2013.01)

(58) Field of Classification Search
CPC .. G06Q 10/06315; G06F 16/26; G06N 20/00; G06N 5/01
USPC ........................................ 705/7.34
See application file for complete search history.

(56) References Cited

U.S. PATENT DOCUMENTS

| | | | |
|---|---|---|---|
| 8,126,784 B1* | 2/2012 | Agarwal | G06Q 10/00 705/28 |
| 8,175,908 B1 | 5/2012 | Anderson | |
| 2004/0024769 A1* | 2/2004 | Forman | G06F 16/353 |
| 2006/0041481 A1* | 2/2006 | Stowe | G06Q 10/06 705/16 |
| 2012/0278205 A1 | 11/2012 | Chin | |
| 2013/0232017 A1 | 9/2013 | Nathanel et al. | |
| 2014/0156399 A1* | 6/2014 | Jones | G06Q 30/0255 705/14.53 |
| 2014/0195396 A1* | 7/2014 | Bhakta | G06Q 40/02 705/35 |
| 2014/0279204 A1 | 9/2014 | Roketenetz et al. | |
| 2015/0170175 A1* | 6/2015 | Zhang | H04M 15/851 705/7.33 |
| 2017/0091800 A1 | 3/2017 | Wind, III et al. | |
| 2017/0169447 A1 | 6/2017 | Hajian | |
| 2018/0144389 A1 | 5/2018 | Fredrich et al. | |
| 2018/0204256 A1* | 7/2018 | Bifolco | G06Q 30/0625 |
| 2018/0204267 A1 | 7/2018 | Licht et al. | |
| 2018/0365753 A1 | 12/2018 | Fredrich et al. | |
| 2019/0295148 A1 | 9/2019 | Lefkow et al. | |
| 2020/0342401 A1* | 10/2020 | Rosenfeld | G06Q 30/0202 |
| 2021/0166251 A1 | 6/2021 | Mehmanpazir et al. | |

OTHER PUBLICATIONS

Collaborative planning: supporting automatic replenishment programs. Stank, Theodore P; Daugherty, Patricia J; Autry, Chad W. Supply Chain Management4.2: 75. Emerald Group Publishing Limited. (1999).*

Dynamic pricing and replenishment: Optimality, bounds, and asymptotics. Xiao, Yongbo. Naval Research Logistics65.1: 3-25. Wiley Services, Inc. (Feb. 2018).*

Get Smart (about replenishment). Hoberg, Kai; Herdmann, Christine. Supply Chain Management Review22.1: 12-19. Peerless Media. (Jan./Feb. 2018).*

International Patent Application No. PCT/US2021/063997, Search Report dated Apr. 18, 2022, 3 pages.

International Patent Application No. PCT/US2021/063997, Written Opinion dated Apr. 18, 2022, 4 pages.

International Patent Application No. PCT/US2021/064002, Search Report dated Apr. 13, 2022, 4 pages.

International Patent Application No. PCT/US2021/064002, Written Opinion dated Apr. 13, 2022, 5 pages.

U.S. Appl. No. 7/126,841, Office Action dated Feb. 3, 2022, 21 pages.

U.S. Appl. No. 7/126,841, Final Office Action dated Oct. 14, 2022, 48 pages.

U.S. Appl. No. 7/126,841, Final Office Action dated Aug. 18, 2023, 39 pages.

U.S. Appl. No. 7/126,841, Office Action dated Feb. 2, 2023, 39 pages.

* cited by examiner

AUTOMATED REPLENISHMENT SHOPPING HARMONIZATION

BACKGROUND

Today's consumer has the option to shop in brick and mortar retail outlets, shop online, or patronize retail outlets that have brick and mortar and an online presence. The convenience of shopping through a retail outlets' online presence provides the consumer additional cost and time saving advantages, making the option of purchasing products over the Internet an increasingly popular choice.

The advent of the auto-replenishment system is an evolution to the online shopping phenomenon that increases efficiencies for the consumer by allowing the customer to make purchases, at regular intervals, of consumable items, so that the customer may never run out of these products. The auto-replenishment system eliminates the need for the weekly and monthly purchase of household consumables, and items regularly bought by the consumer household are refilled without the intervention of the consumer. Additionally, the consumer may have the ability to adjust the frequency and volume of the auto-replenishment cart thereby updating the delivery volume and schedule as needed.

The auto-replenishment platform removes the mundane task of re-ordering of consumable household products, freeing up time for the consumer to focus on more enjoyable tasks.

BRIEF DESCRIPTION OF THE DRAWINGS

The detailed description is depicted with reference to the accompanying figures, in which the left most digit(s) of a reference number identifies the figure in which the reference number first appears. The use of the same reference numbers in different figures indicates similar or identical items.

DETAILED DESCRIPTION

The disclosure of U.S. application Ser. No. 17/126,841, filed Dec. 18, 2020, entitled "Automated Replenishment Shopping Platform" to Tom Furphy, Justin Leigh, and Umair Bashir is hereby incorporated by reference.

This disclosure is directed to techniques for an auto-replenishment platform that exchanges information with retailers and manufacturers to analyze shopping data from multiple sources to determine or predict consumer demand for selected products.

The auto-replenishment platform may be extended to seamlessly integrate into the e-commerce platform of multiple retailer/manufacturers. Specifically, auto-replenishment shopping platform may collect consumer shopping data, analyze it to generate models of the customer product/service demands and share it with retailers/manufacturers to enable retailers/manufacturers to efficiently satisfy consumer demands and expectations. This may be achieved by integrating the consumer and product data from retailers, direct to consumer manufacturers, and other $3^{rd}$ parties and analyzing the data to determine the consumer demand for the product and factors that influence a consumer's perception of convenience or ease in purchasing that product.

Data from different retailer/manufacturer e-commerce platforms can be collected and then combined into a coherent data set. The greater the number of retailers and manufacturers that provide information to the data set, the greater the ability of the auto-replenishment shopping platform to provide accuracy in the shopping data analysis. The data set is then mapped and organized, so that disparate data can be turned into a format suitable for analysis. In turn, a set or collection of consumer data, such as data collected by the auto-replenishment platform from retailers/manufacturers, can also be mined, clustered, and harmonized. This can facilitate integration of the auto-replenishment platform with the e-commerce platform(s), and may enable the auto-replenishment platform to distribute targeted ads, identify and track consumers' delivery/curbside pickup preferences, aggregate customer orders from multiple e-commerce platforms for delivery or pickup at specified intervals, and provide last mile delivery visibility.

Figure 1:
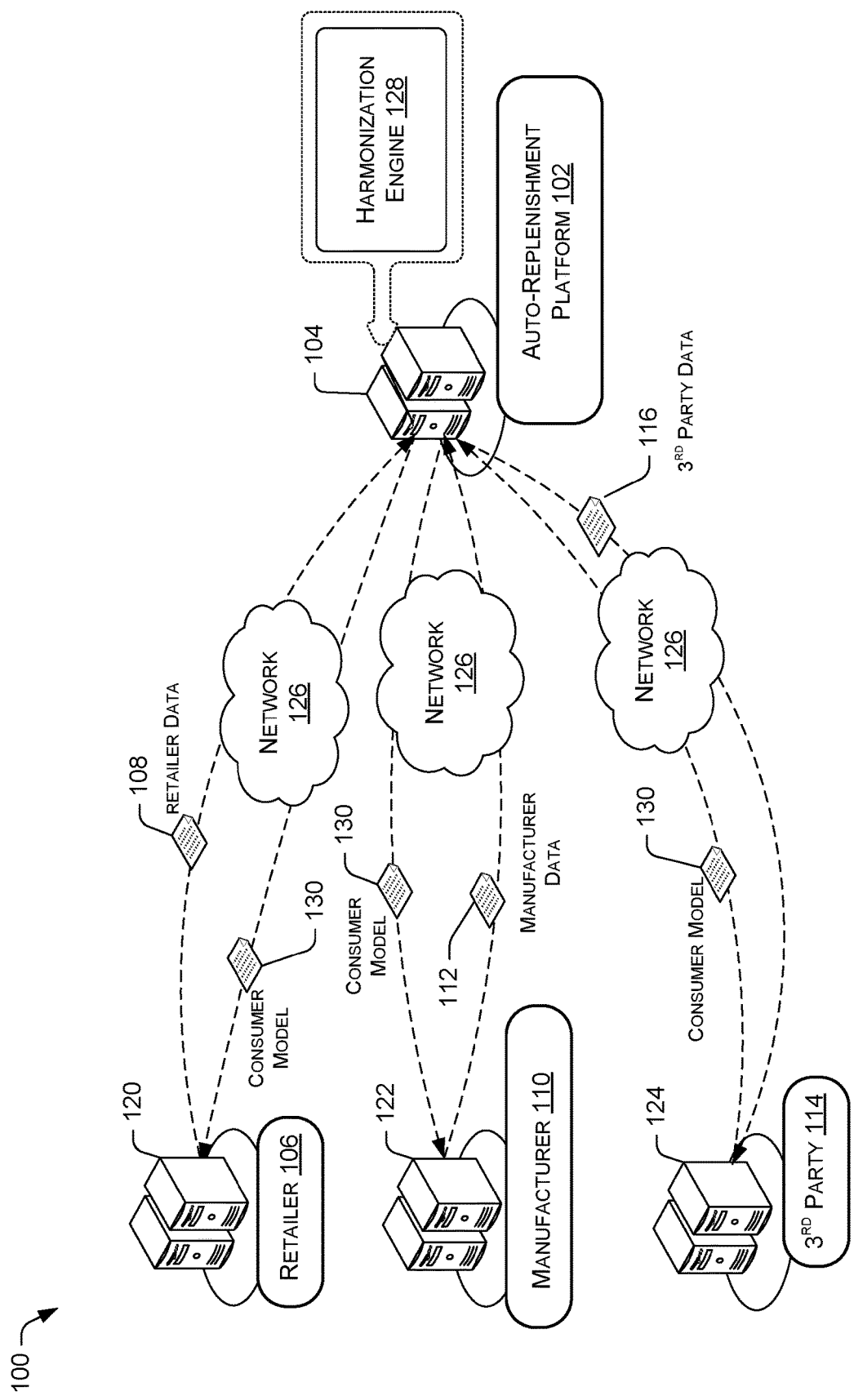
FIG. 1 illustrates an example architecture for implementing the auto-replenishment shopping harmonization method.

Example embodiments variously provide technical advantages, including for example, reducing product waste by enabling consumers to efficiently purchase products in appropriate amounts for delivery/receipt at appropriate times, to avoid wastage of excess product, and to avoid wastage of resources that can result when alternate, less appropriate substitute products are used. In addition, planned and recurring orders of consumer products can enable retailers and manufacturers to use logistical and financial resources more efficiently, and reduce usage of both materials and energy. For example, where products are grouped and shipped together to a consumer, less fuel, packing material, and transportation resources can be used to transport the products to the consumer. Sharing of information allows retailers and manufactures to have greater knowledge and more advance notice of orders and consumer demand, resulting, for example, in longer lead times and more precise information to enable greater planning and efficient use of resources to achieve a more steady or measured manufacture and flow of goods, which means fewer resources can be used to accomplish logistical objectives—smaller, efficient transportation vehicles and manufacturing machines operating sustainably at higher duty cycles, more modest inventory and correspondingly lower warehousing requirements, and so forth. Thus, example embodiments provide technical advantages of conserving and enabling more efficient use of manufacturing, transportation, and computing and network communication resources and machinery Illustrative System Architecture FIG. 1 is a schematic diagram of an illustrative computing environment 100 for using an auto-replenishment platform to perform a harmonization analysis with information received from retailers and direct to consumer manufacturers, and to communicate with retailers and manufacturers to make requests based on the harmonization. The harmonization analysis may be described as the analysis of the coherent set of data set from the retailers and manufacturers to determine both consumer demand for the products and factors that influence a consumer's perception of convenience or ease of purchasing the product. The computing environment may include an auto-replenishment platform 102. The servers 104, of the auto-replenishment platform 102, may interact with one or more retailer's e-commerce platforms, such as a retailer e-commerce platform 106. The retailer e-commerce platform 106 may include an online retailer website for a retailer with which a customer has established one or more user accounts. A user account for a customer may include account access information that enables the customer to conduct a sales transaction with the retailer e-commerce platform 106. The account access information may include bank account numbers, routing numbers, security codes, passwords, payment instrument expiration dates, and/or so forth. Additionally, the retailer e-commerce platform 106 may provide for the customer to select products and services for individual purchase or may provide for repeated purchases at regular time intervals, such as for auto-replenishment. The retailer e-commerce platform 106 may store the customer shopping history data for a specified regular time interval. The shopping data may include a customer identifier, such as a customer account number, a list of purchased products, a quantity of purchased products, a purchased product price, etc. The customer shopping data for the regular time interval may be stored in a file, such as retailer data file 108. The retailer data file 108, may include the shopping data for at least one customer for the regular time interval.

The servers 104, of the auto-replenishment platform 102, may also interact with one or more manufacturers' e-commerce platforms, such as a manufacturer platform 110. The manufacturer e-commerce platform 110 may include the online sales presence of a manufacturer that provides goods directly to the consumer, with which a customer has established one or more user accounts. A user account for a customer may include account access information that enables the customer to conduct a sales transaction with the manufacturer e-commerce platform 110. The account access information may include bank account numbers, routing numbers, security codes, passwords, payment instrument expiration dates, and/or so forth. Additionally, the manufacturer e-commerce platform 110 may provide for the customer to select products and services for individual purchase or may provide for repeated purchases at regular time intervals, such as for auto-replenishment. The manufacturer e-commerce platform 110 may store the customer's shopping history data for a specified regular time interval. The shopping data may include a customer identifier, such as a customer account number, a list of purchased products, a quantity of purchased products, a purchased product price, etc. The customer's shopping history data for the regular time interval may be stored in a file, such as a manufacturer data file 112. The manufacturer data file 112 may include the shopping data for at least one customer for the regular time interval.

Additionally, the servers 104 of the auto-replenishment platform 102 may also interact with one or more $3^{rd}$ party e-commerce platforms, such as a $3^{rd}$ party e-commerce platform 114. The $3^{rd}$ party e-commerce platform 114 may include an online sales presence that resells goods of third-party retailers and manufacturers, and with which a customer has established one or more user accounts. A user account for a customer may include account access information that enables the customer to conduct a sales transaction with the $3^{rd}$ party e-commerce platform 114. The account access information may include bank account numbers, routing numbers, security codes, passwords, payment instrument expiration dates, and/or so forth. Additionally, the $3^{rd}$ party e-commerce platform 114 may provide for the customer to select products and services for individual purchase or may provide for repeated purchases at regular time intervals, such as for auto-replenishment. The $3^{rd}$ party e-commerce platform 114 may store the customer's shopping history data for a specified regular time interval. The shopping history data may include a customer identifier, such as a customer account number, a list of purchased products, a quantity of purchased products, a purchased product price, etc. The customer shopping data for the regular time interval may be stored in a file, such as a $3^{rd}$ party data file 116. The $3^{rd}$ party data file 116, may include shopping data for at least one customer for the regular time interval.

In additional embodiments, the servers 104 of the auto-replenishment platform 102 may communicate with servers 120 of the retailer e-commerce platform 106, may communicate with servers 122 of the manufacturer e-commerce platform 110, and may communicate with servers 124 of the $3^{rd}$ party e-commerce platform 114, via a network 126. The network 126 may be or include one or more of a local area network ("LAN"), a larger network such as a wide area network ("WAN"), a mobile telephone network, and/or a collection of networks, such as the Internet. The network 126 may be a wired network, a wireless network, or both.

The servers may include general purpose computers or other electronic devices that can receive inputs, process the inputs, and generate output data. In other embodiments, the servers may be virtual computing devices in the form of virtual machines or software containers that are hosted in a cloud.

The auto-replenishment platform 102 may initially receive the retailer data file 108 from a retailer, such as retailer e-commerce platform 106. The retailer e-commerce platform 106 may send the retailer data file 108 at regular time intervals or at the request of the auto-replenishment platform 102, via the network 126. The auto-replenishment platform 102 may receive the retailer data file 108 from at least one retailer for the regular time interval. In this case, the auto-replenishment platform 102 may route the retailer data file 108, from at least one retailer, to a harmonization engine 128 for processing. The harmonization engine 128 will be described in greater detail further below.

Additionally, the auto-replenishment platform 102 may receive the manufacturer data file 112 from the manufacturer e-commerce platform 110. The manufacturer e-commerce platform 110 may send the manufacturer data file 112 at the regular time interval, or the request of the auto-replenishment platform 102, via the network 126. The auto-replenishment platform 102 may receive the manufacturer data file 110 from at least one manufacturer for the regular time interval. In this case, the auto-replenishment platform 102 may route the manufacturer data file 110, from at least one manufacturer, to the harmonization engine 128 for processing.

Furthermore, the auto-replenishment platform 102 may receive the manufacturer data file 116 from the $3^{rd}$ party e-commerce platform 114. The $3^{rd}$ party e-commerce platform 114 may send the $3^{rd}$ party data file 116 at the regular time interval, or at the request of the auto-replenishment platform 102, via the network 126. The auto-replenishment platform 102 may receive the $3^{rd}$ party data file 116 from at least one $3^{rd}$ party retailer for the regular time interval. In this case, the auto-replenishment platform 102 may route the $3^{rd}$ party data file 116, from at least one manufacturer, to the harmonization engine 128 for processing.

The harmonization engine 128 may be implemented by the computing devices 104 of the auto-replenishment platform 102. The harmonization engine 128 may collect the retailer data, the manufacturer data, and the $3^{rd}$ party data across all retailers, manufacturers and $3^{rd}$ parties and combine the collected data into a data set. The cohesive data set may then be mapped and organized, via a machine learning algorithm, so that all disparate data is turned into a format that can be used for analysis. For example, such data may be organized in an array format or any other format which can enable the harmonization engine 128 to readily correlate the extracted data from the cohesive data set and correlate with the remaining data from the data set. The harmonization engine 128 may categorize and analyze the cohesive data set to compute the consumer demand for the product and a consumer's perception of convenience or ease in purchasing the product, in real time. As a result, the customer demand and convenience are conditions for the probability of a customer's intent to purchase a specific product, at a particular volume and with a particular frequency over the regular time interval. Based on the harmonization engine 128 analysis, the auto-replenishment platform 102 may distribute targeted ads to customers and may enable the auto-replenishment platform 102 to identify and track customers' last mile delivery preferences, e.g., for different products. In additional embodiments, the harmonization engine 128 may group products ordered by a customer from multiple e-commerce platforms into one bundle for delivery or pickup at specified intervals. As a result, products with disparate shipping intervals are harmonized into one delivery that satisfies the replenishment interval and/or the customer fulfillment options. The grouping of products for shipment or pickup may provide additional efficiencies for the customer in the form of time savings and/or shipping cost savings. Grouping of products for shipment or pick/up can additionally or alternatively provide financial efficiencies for the retailer, for example in the form of reduced shipping and handling costs and related logistical advantages.

The harmonization engine 128 analysis may be stored by the auto-replenishment platform 102 in the consumer model file 130 and routed to the retailer e-commerce platform 106, the manufacturer e-commerce platform 110, and the $3^{rd}$ party e-commerce platform or any other party that may or may not have a commercial relationship with the auto-replenishment platform 102. In additional embodiments, data contained with the consumer model file 130 may be anonymized prior to being routed, so that the original data source may not be identifiable.

Example Server Components

Figure 2:
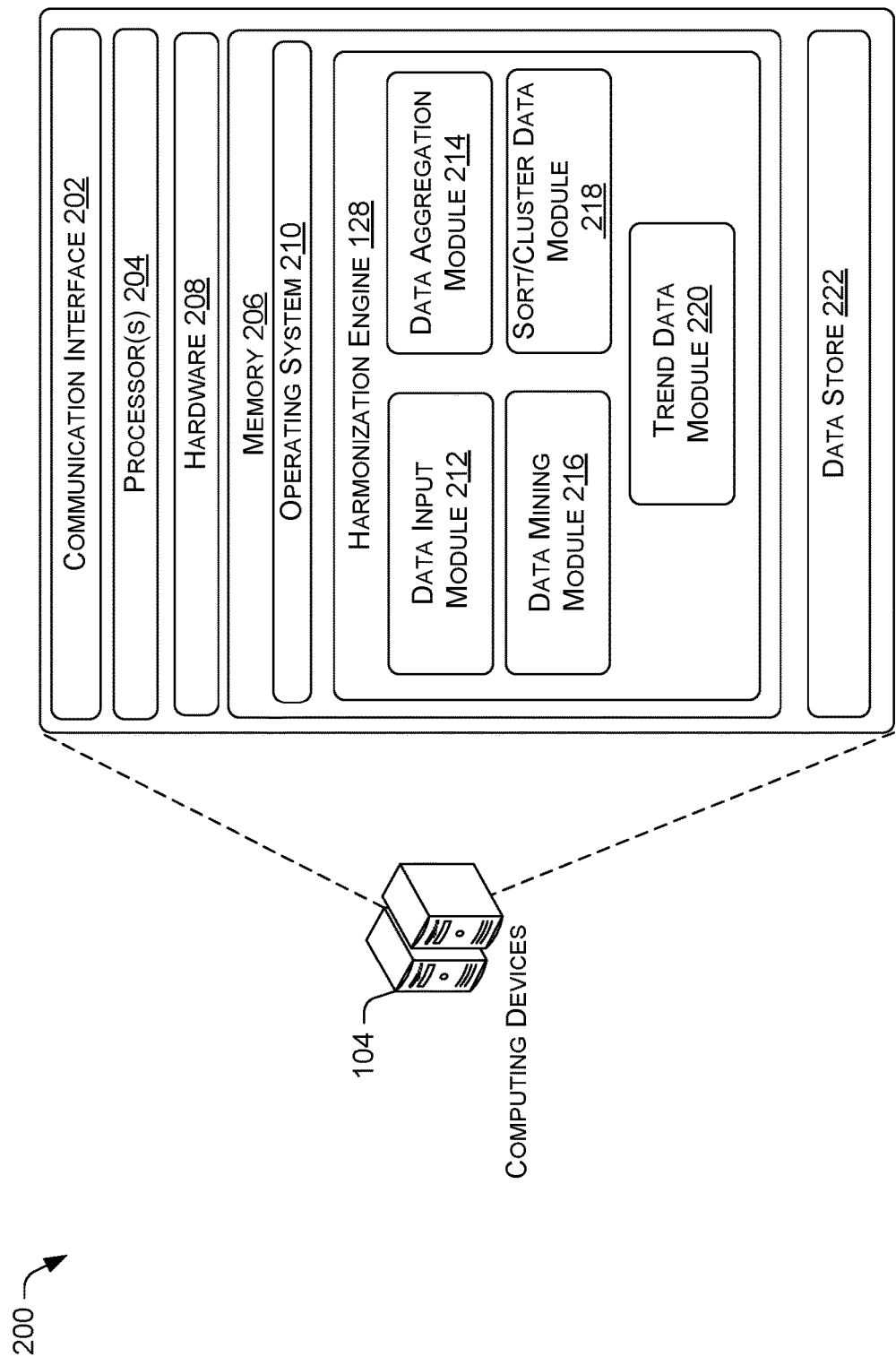
FIG. 2 is a block diagram showing various components of a computing device that implements the auto-replenishment shopping harmonization.

FIG. 2 is a block diagram showing various components of the auto-replenishment platform 102 that implements the harmonization engine 128. The auto-harmonization engine 128 may be implemented on one or more computing devices 104 that are a part of the auto-replenishment platform 102. The computing devices 104 may include general purpose computers, such as desktop computers, tablet computers, laptop computers, servers, or other electronic devices that are capable of receiving inputs, processing the inputs, and generating output data. In other embodiments, the computing devices 104 may be virtual computing devices in the form of virtual machines or software containers that are hosted in a cloud. The computing devices 104 may be equipped with a communication interface 202, one or more processors 204, memory 206, and device hardware 208. The communication interface 202 may include wireless and/or wired communication components that enable the computing devices to transmit data to and receive data from other networked devices via a communication network. The device hardware 208 may include additional hardware that performs user interface, data display, data communication, data storage, and/or other server functions.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, Random-Access Memory (RAM), Dynamic Random-Access Memory (DRAM), Read-Only Memory (ROM), Electrically Erasable Programable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Computer readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanism.

The processors 204 and the memory 206 of the computing devices 104 may implement an operating system 210 and the harmonization engine 128. The operating system 210 may include components that enable the computing devices 104 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The harmonization engine 128 may include a data input module 212, a data aggregation module 214, and data mining module 216, a sort/cluster data module 218, and a trend data module 220. The auto-replenishment engine 124 may also interact with a data store 222. These modules may include routines, program instructions, objects, and/or data structures that perform particular tasks or implement particular abstract data types.

The data input module 212 may receive retailer data 108, manufacturer data 112, and $3^{rd}$ party data 116 via the network 126. The retailer data 108 may include the consumer shopping data or the products that are in the consumer shopping cart of the retailer. Example consumer shopping data may include a retailer customer identifier, such as a customer account number, a list of purchased products, a volume of purchased products, a suggested retail price, a product purchase price, and any retailer discounts. Additionally, this may include a list of products the consumer ordered repeatedly for a set time period through the e-commerce platform or via the auto-replenishment platform of the retailer e-commerce platform.

The manufacturer data files 112 may include the consumer shopping data or the products that are in the consumer shopping cart of a manufacturer that retails directly to the consumer. Example consumer shopping data may include a manufacturer customer identifier, such as a customer account number, a list of purchased products, a volume of purchased products, a suggested retail price, a product purchase price, and any manufacturer discounts. Additionally, this may include a list of products the consumer ordered repeatedly from the manufacturer for a set time period through the e-commerce platform or via the auto-replenishment platform of the manufacturer e-commerce platform.

The $3^{rd}$ party data files 116 may include the consumer shopping data or the products that are in the consumer shopping cart of a $3^{rd}$ party that retails the products of other retailers or manufacturers. Example consumer shopping data in the data files 116 may include a $3^{rd}$ party customer identifier, such as a customer account number, a list of purchased products, a volume of purchased products, a suggested retail price, a product purchase price, and any manufacturer and retailer discounts. Additionally, the data may include a list of products the consumer ordered repeatedly from the $3^{rd}$ party for a set time period through the e-commerce platform or via the auto-replenishment platform of the $3^{rd}$ party e-commerce platform.

The data aggregation module 214 may combine the retailer data files, the manufacturer data files and the $3^{rd}$ party data files, for the regular time interval, into a combined data set and prepare the combined data set for processing and further analysis. Preparation of the data set may include sorting the combined data by specific categories or values. Data in the set may be sorted by one category or multiple categories. In cases where the data is sorted by multiple categories, the first category may be given a higher priority than a second category, the second category may be higher priority than a third category, and so on. For example, in example embodiments the data may be sorted by categories of products, then in each product category; the products may be sorted by manufacturer. Furthermore, the products listed in each manufacturer category may be ranked by volume or price. In additional embodiments, the data aggregation module 214 may anonymize the data so that the original source for the data may not be identifiable.

The data mining module 216 may apply a decision tree algorithm to the combined data to identify critical features of one or more conditions that lead to the determination of anomalies, patterns, and correlations within the data sets to predict outcomes.

Accordingly, the data mining module 216 uses the aggregated combined data from the data aggregation module 214 as an input to decision tree learning in order to discover data trends from an output decision tree. Starting from the categories of the combined data, a decision tree learning algorithm may find a first data point for the data trend, corresponding to a first-time value. The data mining module may define the first-time value as a datum point for establishing the data trend in real time. From an updated aggregated combined data set, the decision tree algorithm may find a second data point for the data trend and a corresponding second time value. For example, the updated aggregated combined data results in a second time value, and if the second time value is current or very recent, then the second data point can indicate a real-time status of the data trend. A relationship between the first data point and a second data point is represented by a tree leaf in the decision tree. An update in the aggregated combined data set and subsequent or consequent change in the relationship between data sets may create new leaf nodes for the decision tree and updates to the data trend.

The sort/cluster data module 218 may extract and group decision tree leaves based on relationships of data points. The data points may be sub-divided into clusters such that items in a cluster may be similar to one another, but different from items in another cluster. The clusters may reveal associations, patterns, and relationships between the data and may be grouped by a category of products, a specific geographic area, by consumer or any other set of data points that determine both consumer demand for the product and factors that influence a consumer's perception of convenience or ease in purchasing the product. For example, a cluster may establish that a segment of society may prefer a specific auto-replenishment product at a specific regular time interval. The clustering of decision tree leaves of the decision tree may determine a model constrained by consumer/manufacturer data for the consumer model in real time.

The trend data module 220 may establish the relative consumer model 130 for a set time period. The consumer model 130 may be comprised of a grouping of clusters and/or data that model product/service consumer demand and product/service factors that influence a consumer's perception of convenience or ease in purchasing the product/service. For example, the clusters may show a consumer's likelihood of selecting a product/service from available alternatives, a list of products that exhibit a consumer inclination for auto-replenishment, or any other criteria that reflect a consumer preference. The clusters may be categorized by geographic area, by consumer demographics, by consumer replenishment interval preferences, by consumer shipping preferences, by product category, and so forth. The trend data module 220 may update the consumer model 130 as tree leaves from the tree learning algorithms change in real time, and data clusters are revised and updated. In additional embodiments, the trend data module 220 may determine the preferred consumer fulfillment options and may aggregate products with disparate fulfillment intervals into one shipment, or pickup, that satisfies the replenishment interval and/or the customer fulfillment options.

The data store module 222 may store data that is used by the various modules of the auto-replenishment engine 128. The data store module 222 may include one or more databases, such as relational databases, object databases, object-relational databases, and/or key-value databases. In various embodiments, the data store module 222 may store the retailer data file 108 and updates, the manufacturer data file 112 and updates, the $3^{rd}$ party data file 116 and updates, and the consumer model 130.

Illustrative Operations

Figure 3:
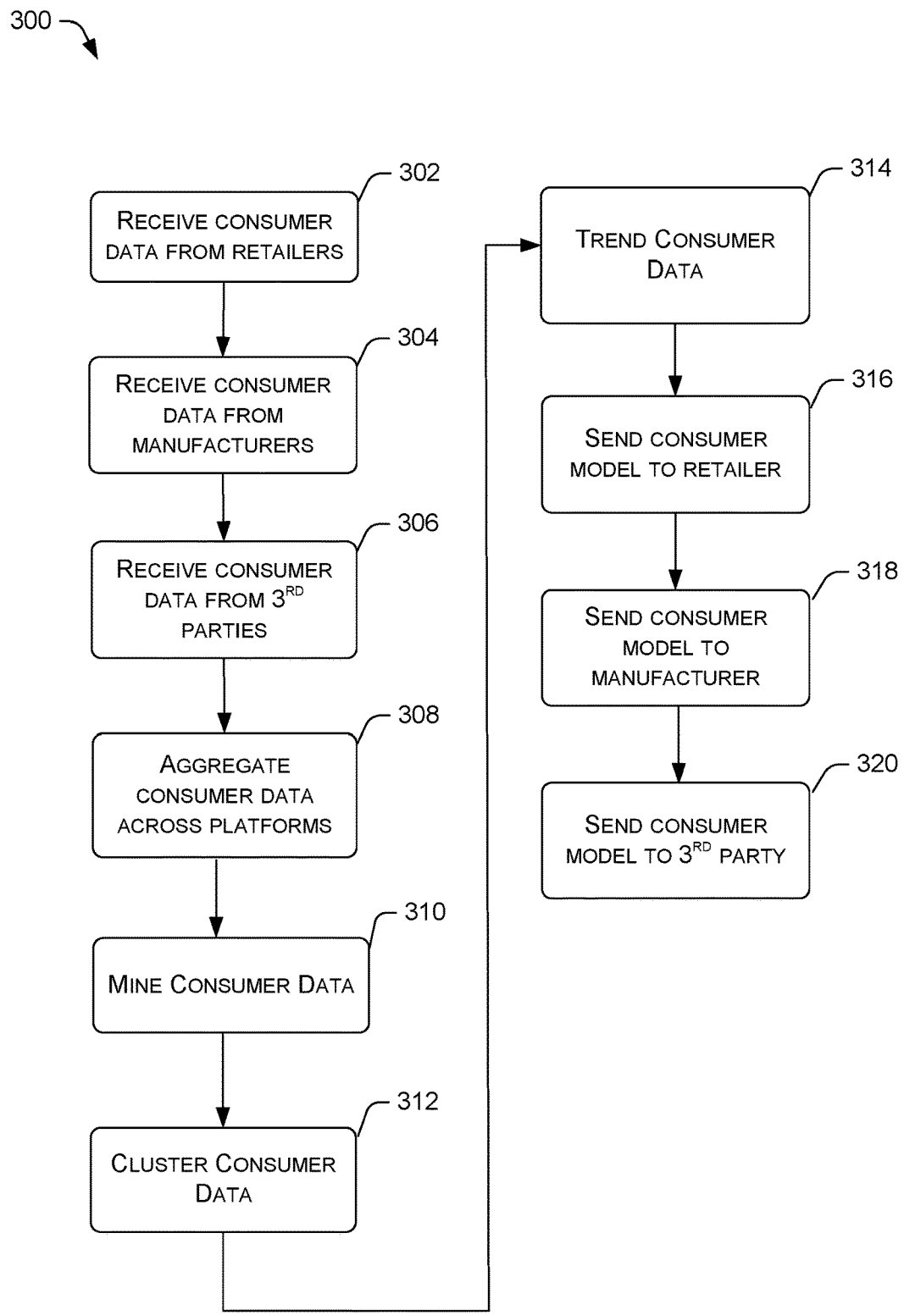
FIG. 3 is a flow diagram of an example process for the auto-replenishment shopping harmonization that is implemented by the auto-replenishment platform.
Figure 4:
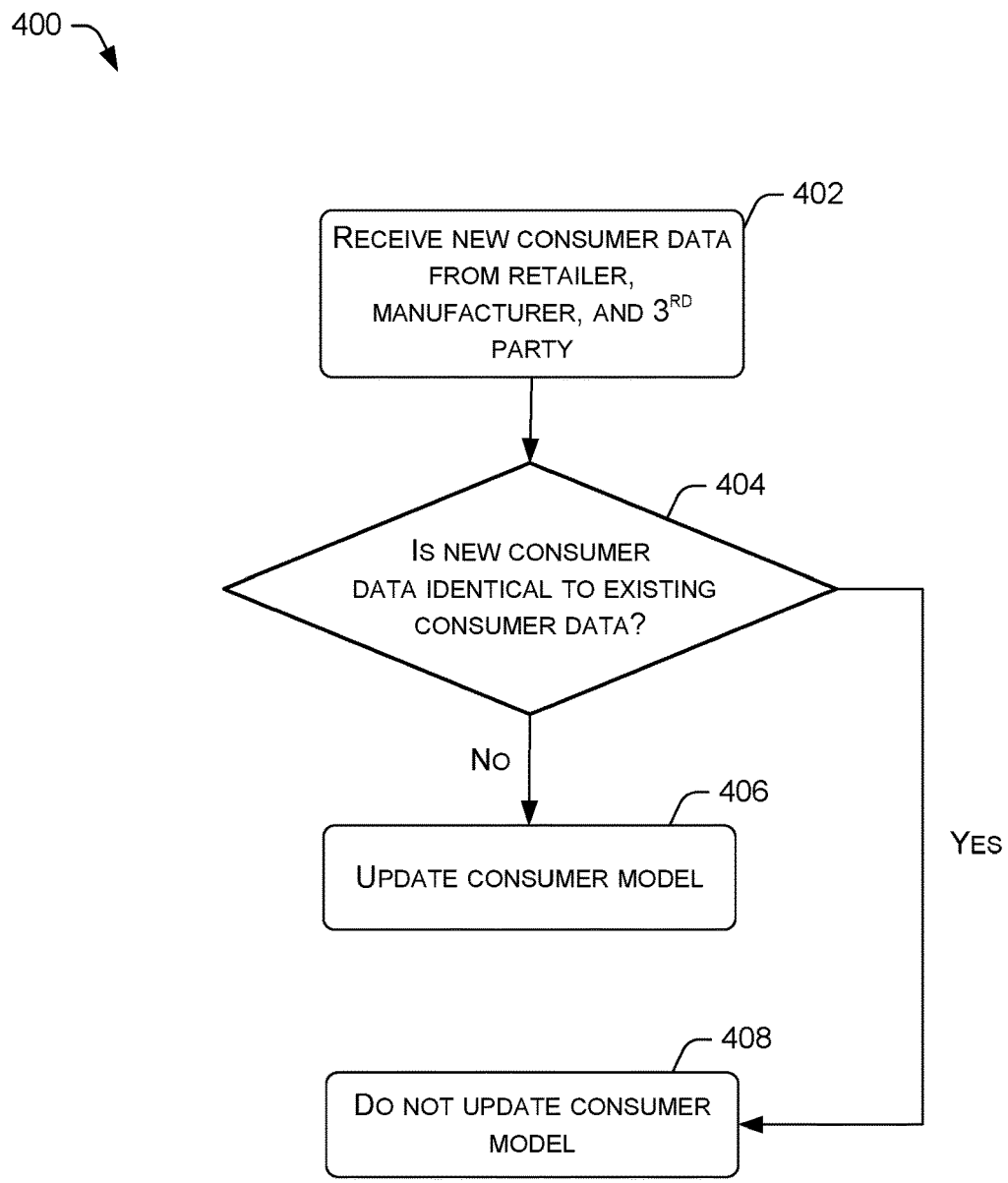
FIG. 4 is a flow diagram of an example process for updating the consumer model for the harmonization.

FIG. 3-4 presents illustrative processes 300-400 for implementing the harmonization for automated replenishment shopping. Each of the processes 300-400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described blocks can be combined in any order and/or in parallel to implement the process. For discussion purposes, the processes 300-400 are described with reference to auto-replenishment harmonization environment 100 of FIG. 1.

FIG. 3 is a flow diagram of an example process for implementing the harmonization of the auto-replenishment shopping via an auto-replenishment platform. At block 302, an auto-replenishment platform receives, via at least one retailer e-commerce platform, at least one retailer data file for a regular time interval. From block 302, control proceeds to block 304.

At block 304, an auto-replenishment platform receives, via at least one manufacturer e-commerce platform, at least one manufacturer data file for a regular time interval. From block 304, control proceeds to block 306.

At block 306, an auto-replenishment platform receives, via at least one $3^{rd}$ party e-commerce platform, at least one $3^{rd}$ party data file for a regular time interval. From block 306, control proceeds to block 308.

At block 308, the harmonization engine compiles the retailer data files, the manufacturer data files and the $3^{rd}$ party data files into one large data file for analysis. From block 308, control proceeds to block 310.

At block 310, the harmonization engine applies a machine learning analysis tool to examine data trends, make comparisons, reveal information and insights, or discover hidden patterns that would not be observable when the data elements are viewed in isolation. The analysis tool objective is to identify auto-replenishment product demand and consumer preferences. From block 310, control proceeds to block 312.

At block 312, the harmonization engine clusters the data by the relationship of data points. Data points of similar qualities or with interrelations are organized into groups that define product demand and consumer preferences. From block 312, control proceeds to block 314.

At block 314, the harmonization engine develops a consumer model for the regular time interval. The consumer model contains clusters and/or data that model product/service demand and customer preferences. From block 314, control proceeds to block 316.

At block 316, the auto-replenishment platform sends the consumer model to at least one retailer for the integration of the retailer e-commerce platform and the auto-replenishment platform. From block 316, control proceeds to block 318.

At block 318, the auto-replenishment platform sends the consumer model to at least one manufacturer for the integration of the manufacturer e-commerce platform and the auto-replenishment platform. From block 318, control proceeds to block 320.

At block 320, the auto-replenishment platform sends the consumer model to at least one $3^{rd}$ party retailer for the integration of the $3^{rd}$ party retailer e-commerce platform and the auto-replenishment platform.

In accordance with example embodiments, process steps shown in FIG. 4 may be variously reordered and/or performed in parallel.

FIG. 4 is a flow diagram of an example process 400 for updating the consumer model 130 by the harmonization engine of the auto-replenishment platform. At block 402, the harmonization engine 128 receives new data files from at least one retailer e-commerce platform, from at least one manufacturer e-commerce platform, and at least one $3^{rd}$ party platform for the regular time interval. From block 402, control proceeds to decision block 404.

At decision block 404, if the harmonization engine establishes that the new retailer, manufacturer, and $3^{rd}$ party data files for the regular time interval are not identical to the existing retailer, manufacturer and $3^{rd}$ party data files ("no" at decision block 404), then the process 400 may proceed to block 406. If the harmonization engine establishes that new retailer, manufacturer, and $3^{rd}$ party data files for the regular time interval are identical to the existing retailer, manufacturer and $3^{rd}$ party data files ("yes" at decision block 404), then the process 400 may proceed to block 408.

At block 406, the harmonization engine updates the consumer model 130.

At block 408, the harmonization model does not update the consumer model 130.

The consumer model 130 may be used by the auto-replenishment platform 102 to group products ordered by a customer from multiple e-commerce platforms into one bundle for delivery or pickup at specified intervals, so that products with disparate shipping intervals may be harmonized into one delivery that satisfies the replenishment interval and/or the customer fulfillment options. The grouping of products for shipment or pickup may provide additional efficiencies for the customer in the form of time savings and/or shipping cost savings. Grouping of products for shipment or pick/up can additionally or alternatively provide financial efficiencies for the retailer, for example in the form of reduced shipping and handling costs and related logistical advantages.

CONCLUSION

Although the subject matter has been described in language specific to the structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer readable media storing computer-executable instructions that, when executed, cause one or more processors to perform acts comprising:
   receiving consumer data from at least one retailer e-commerce platform for a regular time interval;
   receiving consumer data from at least one manufacturer e-commerce platform for a regular time interval;
   receiving consumer data from at least one 3rd party e-commerce platform for a regular time interval;
   comparing the consumer data received from the at least one retailer e-commerce platform to additional consumer data previously received from the at least one retailer e-commerce platform;
   comparing the consumer data received from the at least one manufacturer e-commerce platform to additional consumer data previously received from the at least one manufacturer e-commerce platform;
   comparing the consumer data received from the at least one 3rd party e-commerce platform to additional consumer data previously received from the at least one 3rd party e-commerce platform;
   based on comparing the consumer data received from the at least one retailer e-commerce platform to the additional consumer data previously received from the at least one retailer e-commerce platform, determining that the consumer data received from the at least one retailer e-commerce platform does not match the additional consumer data previously received from the at least one retailer e-commerce platform;
   based on comparing the consumer data received from the at least one manufacturer e-commerce platform to the additional consumer data previously received from the at least one manufacturer e-commerce platform, determining that the consumer data received from the at least one manufacturer e-commerce platform does not match the additional consumer data previously received from the at least one manufacturer e-commerce platform;

based on comparing the consumer data received from the at least one 3rd party e-commerce platform to the additional consumer data previously received from the at least one 3rd party e-commerce platform, determining that the consumer data received from the at least one 3rd party e-commerce platform does not match the additional consumer data previously received from the at least one 3rd party e-commerce platform;

based on determining (i) that the consumer data received from the at least one retailer e-commerce platform does not match the additional consumer data previously received from the at least one retailer e-commerce platform, (ii) that the consumer data received from the at least one manufacturer e-commerce platform does not match the additional consumer data previously received from the at least one manufacturer e-commerce platform, and (iii) that the consumer data received from the at least one 3rd party e-commerce platform does not match the additional consumer data previously received from the at least one 3rd party e-commerce platform, aggregating the consumer data, mining the aggregated consumer data, clustering the mined consumer data and generating a consumer model at regular time intervals to determine both consumer demand for a product and factors that influence a consumer's perception of convenience or ease in purchasing the product;

aggregating shipments of a consumer's ordered products that have disparate shipping intervals for delivery or pickup as preferred by the consumer's fulfillment option or as required by a product's replenishment interval;

sending the consumer model to at least one retailer e-commerce platform for the integration of the retailer e-commerce platform and an auto-replenishment platform;

sending the consumer model to at least one manufacturer e-commerce platform for the integration of the manufacturer e-commerce platform and the auto-replenishment platform;

sending the consumer model to at least one 3rd party e-commerce platform for the integration of the 3rd party e-commerce platform and the auto-replenishment platform; and sending the consumer model to any other party.

2. The one or more non-transitory computer readable media of claim 1, wherein the consumer data is a record of consumer purchased goods and services for a regular time interval, wherein the consumer data includes a list of products and services, a quantity of products and services, and associated pricing paid for the products and services.

3. The one or more non-transitory computer readable media of claim 1, wherein the consumer model is based on the consumer data received from at least one retailer e-commerce platform, at least one manufacturer e-commerce platform, and at least one 3rd party e-commerce platform.

4. The one or more non-transitory computer readable media of claim 1, wherein the aggregating includes combining retailer, manufacturer, 3rd party data by product category, pricing or geographic location.

5. The one or more non-transitory computer readable media of claim 1, wherein the mining includes applying a machine learning algorithm that includes the aggregated data of a retailer consumer data, a manufacturer consumer data, and a 3rd party consumer data.

6. The one or more non-transitory computer readable media of claim 1, wherein the clustering includes grouping data by characteristics that determine the consumer demand for a product.

7. The one or more non-transitory computer readable media of claim 1, wherein the generating a consumer model is a determination of the consumer demand for a product and factors that influence a consumer's perception of convenience or ease in purchasing that product.

8. The one or more non-transitory computer readable media of claim 1, wherein the ease of purchasing includes grouping together products ordered by a consumer for delivery or pickup at specified intervals.

9. A system, comprising:
one or more processors; and
memory having instructions stored therein, the instructions, when executed by the one or more processors, cause the one or more processors to perform acts comprising:
receiving consumer data from at least one retailer e-commerce platform for a regular time interval;
receiving consumer data from at least one manufacturer e-commerce platform for a regular time interval;
receiving consumer data from at least one 3rd party e-commerce platform for a regular time interval;
comparing the consumer data received from the at least one retailer e-commerce platform to additional consumer data previously received from the at least one retailer e-commerce platform;
comparing the consumer data received from the at least one manufacturer e-commerce platform to additional consumer data previously received from the at least one manufacturer e-commerce platform;
comparing the consumer data received from the at least one 3rd party e-commerce platform to additional consumer data previously received from the at least one 3rd party e-commerce platform;
based on comparing the consumer data received from the at least one retailer e-commerce platform to the additional consumer data previously received from the at least one retailer e-commerce platform, determining that the consumer data received from the at least one retailer e-commerce platform does not match the additional consumer data previously received from the at least one retailer e-commerce platform;
based on comparing the consumer data received from the at least one manufacturer e-commerce platform to the additional consumer data previously received from the at least one manufacturer e-commerce platform, determining that the consumer data received from the at least one manufacturer e-commerce platform does not match the additional consumer data previously received from the at least one manufacturer e-commerce platform;
based on comparing the consumer data received from the at least one 3rd party e-commerce platform to the additional consumer data previously received from the at least one 3rd party e-commerce platform, determining that the consumer data received from the at least one 3rd party e-commerce platform does not match the additional consumer data previously received from the at least one 3rd party e-commerce platform;

based on determining (i) that the consumer data received from the at least one retailer e-commerce platform does not match the additional consumer data previously received from the at least one retailer e-commerce platform, (ii) that the consumer data received from the at least one manufacturer e-commerce platform does not match the additional consumer data previously received from the at least one manufacturer e-commerce platform, and (iii) that the consumer data received from the at least one 3rd party e-commerce platform does not match the additional consumer data previously received from the at least one 3rd party e-commerce platform, aggregating the consumer data, mining the consumer data, clustering the consumer data and generating a consumer model at regular time intervals to determine both consumer demand for a product and factors that influence a consumer's perception of convenience or ease in purchasing the product;

aggregating shipments of a consumer's ordered products that have disparate shipping intervals for delivery or pickup as preferred by the consumer's fulfillment option or as required by a product's replenishment interval;

sending the consumer model to at least one retailer e-commerce platform for the integration of a retailer e-commerce platform and an auto-replenishment platform;

sending the consumer model to at least one manufacturer e-commerce platform for the integration of the manufacturer e-commerce platform and the auto-replenishment platform;

sending the consumer model to at least one 3rd party e-commerce platform for the integration of the 3rd party e-commerce platform and the auto-replenishment platform; and sending the consumer model to any other party.

10. The system of claim 9, wherein the consumer data is a record of consumer purchased goods and services for a regular time interval, wherein the consumer data includes a list of products and services, a quantity of products and services, and associated pricing paid for the products and services.

11. The system of claim 9, wherein the consumer model is based on the consumer data of at least one retailer e-commerce platform, at least one manufacturer e-commerce platform, and at least one 3rd party e-commerce platform.

12. The system of claim 9, wherein the aggregating includes combining retailer, manufacturer, 3rd party data by product category, pricing or geographic location.

13. The system of claim 9, wherein the mining includes applying a machine learning algorithm that includes the aggregated data of a retailer consumer data file, a manufacturer consumer data file, and a 3rd party consumer data file.

14. The system of claim 9, wherein the clustering includes grouping data by characteristics that determine the consumer demand for a product.

15. The system of claim 9, wherein the generating a consumer model is a determination of the consumer demand for a product and factors that influence a consumer's perception of convenience or ease in purchasing that product.

16. The system of claim 9, wherein the ease of purchasing includes grouping together products ordered by a consumer for delivery or pickup at specified intervals.

17. A computer implemented method, comprising:
receiving consumer data from at least one retailer e-commerce platform for a regular time interval;
receiving consumer data from at least one manufacturer e-commerce platform for a regular time interval;
receiving consumer data from at least one 3rd party e-commerce platform for a regular time interval;
comparing the consumer data received from the at least one retailer e-commerce platform to additional consumer data previously received from the at least one retailer e-commerce platform;
comparing the consumer data received from the at least one manufacturer e-commerce platform to additional consumer data previously received from the at least one manufacturer e-commerce platform;
comparing the consumer data received from the at least one 3rd party e-commerce platform to additional consumer data previously received from the at least one 3rd party e-commerce platform;
based on comparing the consumer data received from the at least one retailer e-commerce platform to the additional consumer data previously received from the at least one retailer e-commerce platform, determining that the consumer data received from the at least one retailer e-commerce platform does not match the additional consumer data previously received from the at least one retailer e-commerce platform;
based on comparing the consumer data received from the at least one manufacturer e-commerce platform to the additional consumer data previously received from the at least one manufacturer e-commerce platform, determining that the consumer data received from the at least one manufacturer e-commerce platform does not match the additional consumer data previously received from the at least one manufacturer e-commerce platform;
based on comparing the consumer data received from the at least one 3rd party e-commerce platform to the additional consumer data previously received from the at least one 3rd party e-commerce platform, determining that the consumer data received from the at least one 3rd party e-commerce platform does not match the additional consumer data previously received from the at least one 3rd party e-commerce platform;
based on determining (i) that the consumer data received from the at least one retailer e-commerce platform does not match the additional consumer data previously received from the at least one retailer e-commerce platform, (ii) that the consumer data received from the at least one manufacturer e-commerce platform does not match the additional consumer data previously received from the at least one manufacturer e-commerce platform, and (iii) that the consumer data received from the at least one 3rd party e-commerce platform does not match the additional consumer data previously received from the at least one 3rd party e-commerce platform, aggregating the consumer data, mining the consumer data, clustering the consumer data and generating a consumer model at regular time intervals to determine both consumer demand for a product and factors that influence a consumer's perception of convenience or ease in purchasing the product;
aggregating shipments of a consumer's ordered products that have disparate shipping intervals for delivery or pickup as preferred by the consumer's fulfillment option or as required by a product's replenishment interval;

sending the consumer model to at least one retailer e-commerce platform for the integration of a retailer e-commerce platform and an auto-replenishment platform;

sending the consumer model to at least one manufacturer e-commerce platform for the integration of a manufacturer e-commerce platform and the auto-replenishment platform;

sending the consumer model to at least one 3rd party e-commerce platform for the integration of a 3rd party e-commerce platform and the auto-replenishment platform; and sending the consumer model to any other party.

18. The computer implemented method of claim 17, wherein the consumer data is a record of consumer purchased goods and services for a regular time interval, wherein the consumer data includes a list of products and services, a quantity of products and services, and associated pricing paid for the products and services.

19. The computer implemented method of claim 17, wherein the consumer model is based on the consumer data of at least one retailer e-commerce platform, at least one manufacturer e-commerce platform, and at least one 3rd party e-commerce platform.

20. The computer implemented method of claim 17, wherein the aggregating includes combining retailer, manufacturer, 3rd party data by product category, pricing or geographic location.

* * * * *